(12) United States Patent
Koslowski et al.

(10) Patent No.: US 11,904,670 B2
(45) Date of Patent: Feb. 20, 2024

(54) SLIDING SOFT-TOP CONVERTIBLE ROOF

(71) Applicant: MyTop IP, LLC, Atlanta, GA (US)

(72) Inventors: Christoph Koslowski, Northwest Atlanta, GA (US); Joachim Maass, Bissendorf (DE)

(73) Assignee: MyTop IP, LLC, Atlanta, GA (US)

( * ) Notice: Subject to any disclaimer, the term of this patent is extended or adjusted under 35 U.S.C. 154(b) by 80 days.

(21) Appl. No.: 17/586,966

(22) Filed: Jan. 28, 2022

(65) Prior Publication Data

US 2022/0242207 A1 Aug. 4, 2022

Related U.S. Application Data

(60) Provisional application No. 63/145,693, filed on Feb. 4, 2021.

(51) Int. Cl.
*B60J 7/06* (2006.01)

(52) U.S. Cl.
CPC ...................... *B60J 7/061* (2013.01)

(58) Field of Classification Search
CPC ............ B60J 7/061; B60J 7/062; B60J 7/064; B60J 7/065; B60J 7/02; B60J 7/028; B60J 7/1265; B60J 7/1234; B60J 7/1291; B60J 7/1226; B60J 11/04
USPC .............. 296/136.11, 136.1, 136.09, 107.13, 296/107.19, 107.09, 224, 107.01, 109, 296/219
See application file for complete search history.

(56) References Cited

U.S. PATENT DOCUMENTS

| | | | | |
|---|---|---|---|---|
| 1,362,476 A | * | 12/1920 | Ernest | B60J 1/2011 296/99.1 |
| 1,689,896 A | * | 10/1928 | Seitz | B60J 7/063 296/109 |
| 1,849,099 A | * | 3/1932 | Lehwess | B60J 7/064 296/109 |
| 1,917,695 A | * | 7/1933 | Arthur | B60J 7/067 296/219 |
| 2,694,598 A | | 11/1954 | Ulrich | |
| 2,861,836 A | * | 11/1958 | Goeggel | B60J 7/047 49/82.1 |
| 5,018,784 A | * | 5/1991 | Yokouchi | B60J 7/201 296/219 |
| 5,033,789 A | * | 7/1991 | Hayashi | B60J 1/1823 296/216.02 |
| 5,054,847 A | | 10/1991 | Asoh et al. | |

(Continued)

*Primary Examiner* — Amy R Weisberg
*Assistant Examiner* — Veronica M Shull
(74) *Attorney, Agent, or Firm* — Harness Dickey & Pierce PLC

(57) ABSTRACT

A sliding soft-top convertible roof is provided. In another aspect, a convertible roof apparatus including rollers which sandwich a fore-and-aft elongated guide rail therebetween. A further aspect includes roof bow mounted brackets extending between an elongated and stationary guide rail and channels within which move cables for raising and lowering a roof cover, with the brackets being moveably coupled to the guide rail. Still another aspect includes a sport utility vehicle having a passenger compartment and a rear cargo compartment, where a sliding soft-top convertible roof is retractable to a position rear of the passenger compartment, lower than a nominal closed roof surface and above only a forward portion of the cargo compartment.

26 Claims, 17 Drawing Sheets

(56) References Cited

U.S. PATENT DOCUMENTS

| | | | |
|---|---|---|---|
| 5,301,987 A | 4/1994 | Tokarz et al. | |
| 5,678,881 A | 10/1997 | Tokarz | |
| 5,755,467 A | 5/1998 | Dilluvio et al. | |
| 6,155,614 A | 12/2000 | Lange | |
| 6,347,828 B1 | 2/2002 | Rapin et al. | |
| 6,398,296 B1 * | 6/2002 | Mayer | B60J 7/061 |
| | | | 296/219 |
| 6,530,621 B1 * | 3/2003 | Williams | B60J 7/102 |
| | | | 296/147 |
| 6,659,534 B2 | 12/2003 | Willard | |
| 6,676,192 B2 * | 1/2004 | Marold | B60J 7/061 |
| | | | 296/216.04 |
| 6,767,047 B2 | 7/2004 | Eichhorst et al. | |
| 7,021,696 B2 | 4/2006 | Doncov et al. | |
| 7,063,372 B2 | 6/2006 | Manders et al. | |
| 7,114,769 B2 | 10/2006 | Storc et al. | |
| 7,163,260 B2 | 1/2007 | Reitzloff et al. | |
| 7,226,110 B2 | 6/2007 | Doncov et al. | |
| 7,240,960 B2 * | 7/2007 | Fallis, III | B60J 7/1291 |
| | | | 296/218 |
| 7,303,227 B2 | 12/2007 | Reitzloff et al. | |
| 7,399,030 B2 | 7/2008 | Reitzloff et al. | |
| 7,523,977 B2 | 4/2009 | Fallis, III et al. | |
| 7,527,328 B2 | 5/2009 | Reitzloff et al. | |
| 7,938,483 B2 | 5/2011 | Reitzloff et al. | |
| 9,346,342 B1 | 5/2016 | Bowles | |
| 9,776,488 B2 | 10/2017 | Bowles | |
| 9,963,022 B2 | 5/2018 | Bowles | |
| 10,155,434 B2 | 12/2018 | Hoelzel et al. | |
| 10,202,073 B2 | 2/2019 | Schuett et al. | |
| 10,220,689 B2 | 3/2019 | Sviberg | |
| D860,867 S | 9/2019 | Goodrich et al. | |
| 10,399,527 B2 | 9/2019 | Schutt et al. | |
| D877,899 S | 6/2020 | Langhals et al. | |
| 10,974,575 B2 | 4/2021 | Mueller et al. | |
| 10,974,579 B2 | 4/2021 | Mueller et al. | |
| 10,974,679 B2 | 4/2021 | Sommer | |
| 11,247,544 B2 | 2/2022 | Haberl et al. | |
| 11,299,924 B1 * | 4/2022 | Romein | B60J 7/062 |

* cited by examiner

SLIDING SOFT-TOP CONVERTIBLE ROOF

CROSS-REFERENCE TO RELATED APPLICATIONS

This application claims priority to U.S. Provisional Patent Application Ser. No. 63/145,693, filed on Feb. 4, 2021, which is incorporated by reference herein.

BACKGROUND AND SUMMARY

The present disclosure relates generally to convertible roofs and more particularly to a sliding soft-top convertible roof used with an automotive vehicle.

Soft-top convertible roofs for automotive vehicles are well known. Various attempts have been made to slidably open and close traditional convertible roof in a sunroof manner to avoid difficult to package top-stack linkages. Examples of such traditional sliding soft-tops are disclosed in U.S. Pat. No. 7,063,372 entitled "Open Roof Construction for a Vehicle, as well as a Vehicle having such Open Roof Construction" which issued to Manders et al. on Jun. 20, 2006; U.S. Pat. No. 7,163,260 entitled "Automotive Vehicle Open Air System" which issued to Reitzloff et al. on Jan. 16, 2007; and U.S. Pat. No. 7,938,483 entitled "Movable Vehicular Roof" which issued to Reitzloff et al. on May 10, 2011; all of which are incorporated by reference herein.

Furthermore, movement of a sliding convertible roof around the upper rearmost portion of the passenger compartment is difficult, especially when the generally horizontal roof surface is sharply angled from the generally vertical back surface when viewed from the side. Exemplary attempts to perform this functionality are disclosed in U.S. Pat. No. 2,694,598 entitled "Convertible Top Construction" which issued to Ulrich on Nov. 16, 1954; U.S. Pat. No. 5,054,847 entitled "Flexible Top Apparatus for a Vehicle" which issued to Asoh et al. on Oct. 8, 1991; U.S. Pat. No. 6,676,192 entitled "Motor Vehicle having a Roof with Sliding Convertible Top" which issued to Marold et al. on Jan. 13, 2004; and U.S. Pat. No. 10,220,689 entitled "Top of a Vehicle comprising Locking Means" which issued to Sviberg on Mar. 5, 2019. These patents are incorporated by reference herein. The conventional convertible tops of these patents employ very complicated mechanisms which are undesirably difficult to store when the top is open.

In accordance with the present invention, a sliding soft-top convertible roof is provided. In another aspect, a convertible roof apparatus including rollers which sandwich a fore-and-aft elongated guide rail therebetween. A further aspect includes roof bow mounted brackets extending between an elongated and stationary guide rail and channels within which move cables for raising and lowering a roof cover, with the brackets being moveably coupled to the guide rail. Still another aspect includes a sport utility vehicle having a passenger compartment and a rear cargo compartment, where a sliding soft-top convertible roof is retractable to a position rear of the passenger compartment, lower than a nominal closed roof surface and above only a forward portion of the cargo compartment. Methods of assembling and using a sliding automotive convertible roof apparatus are also provided.

The present apparatus is advantageous over prior constructions. For example, the present convertible top does not encroach on the passenger compartment and only minimally obstructs a forward portion of the rear cargo compartment, when the top is retracted. Furthermore, the present apparatus smoothly slides around the sharp rear corner between a generally horizontal section and a generally vertical section of the guide rail, without binding, when the roof cover is opened and closed. The automatically powered actuators for the sliding soft-top roof are stowed under the rear passenger seating cushions within the passenger compartment, thereby beneficially use otherwise wasted space while also protecting the actuators. The present apparatus also allows a user to use the vehicle with the convertible roof slid to a partially open position, with infinite open positioning anywhere between fully open and fully closed. Additional advantages and features of the present apparatus will become apparent from the following description and appended claims, taken in conjunction with the accompanying drawings.

DETAILED DESCRIPTION

Figure 1:
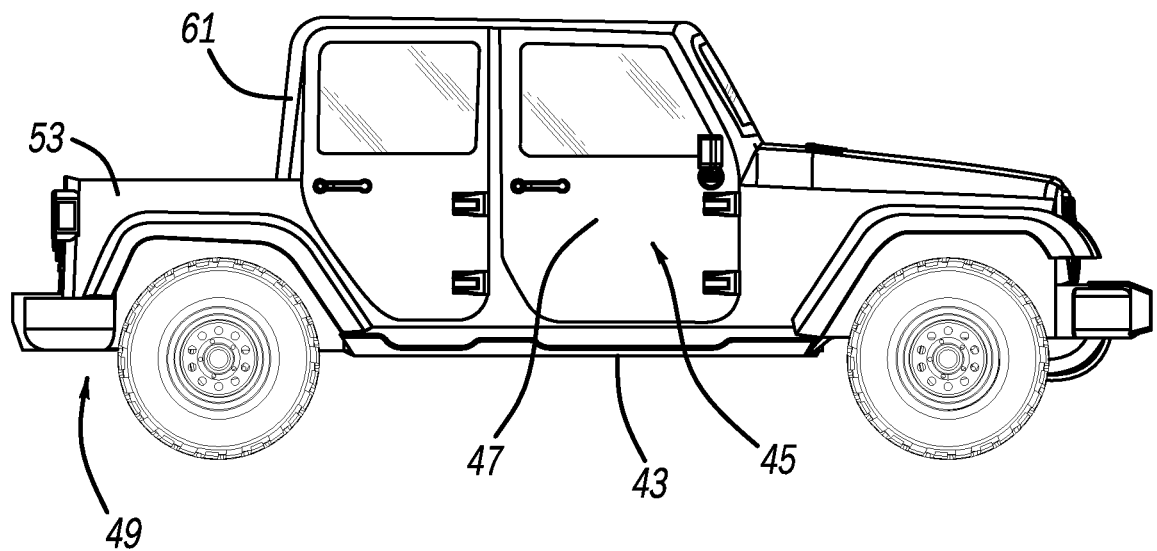
FIG. 1 is a side elevation view showing the present sport utility vehicle and convertible roof apparatus.

A sliding convertible roof apparatus 41 is employed on an automotive vehicle 43, preferably a sport utility vehicle ("SUV") such as a Jeep® brand vehicle. This can best be observed in FIGS. 1, 3, 5 and 6. Automotive vehicle 43 has an engine compartment, a passenger compartment 45 between opposite side passenger doors 47, and a rear cargo compartment 49 defined by a generally horizontal bed 50, generally vertically extending front and sidewalls 51 and 53, respectively, and a moveable rear door or tailgate. Front and rear passenger seats 55 and 57, respectively, are located within passenger compartment 45, forward of front wall of cargo compartment 49. Optionally, auxiliary passenger seating may be present within the rear compartment. Preferably, there are four side passenger doors (with associated door openings if the doors are removed). An exemplary sport utility vehicle is shown in U.S. Pat. No. D887,899 entitled "Automobile Body" which issued to Langhals et al. on Jun. 23, 2020, and is incorporated by reference herein.

Furthermore, a pair of tubular roll bars 61 span above passenger compartment 45 in a generally horizontally elongated and fore-and-aft direction, and then are generally vertically extending from areas just rear, outboard and above rear passenger seats 57, and downwardly ending at mounting locations adjacent a beltline or floor pan between the passenger and cargo compartments. Roll bars 61 are laterally spaced apart. An optional horizontally and laterally elongated beam 63 and front header 65 span between stamped side rails and downwardly extending pillars, which are adjacent the horizontal portions of roll bar 61. C-pillars 67 downwardly extend from the side rails adjacent the rearward portions of the roll bars. Furthermore, the rear and downward portions of the roll bars may have a somewhat diagonal or partially curved orientation. Roll bars 61 are rigidly mounted in a stationary manner to the vehicle's sheet metal structure.

Figure 2:
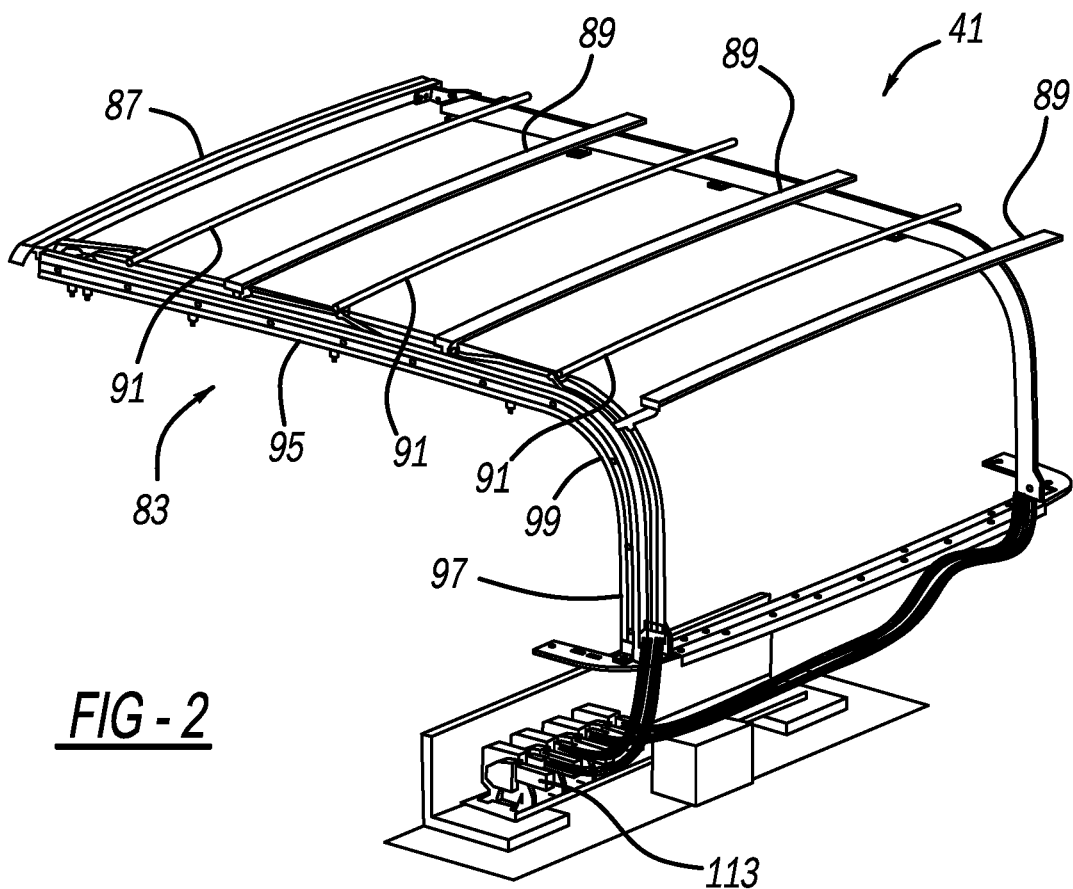
FIG. 2 is a rear and top perspective view showing the present apparatus, in a closed position.
Figure 3:
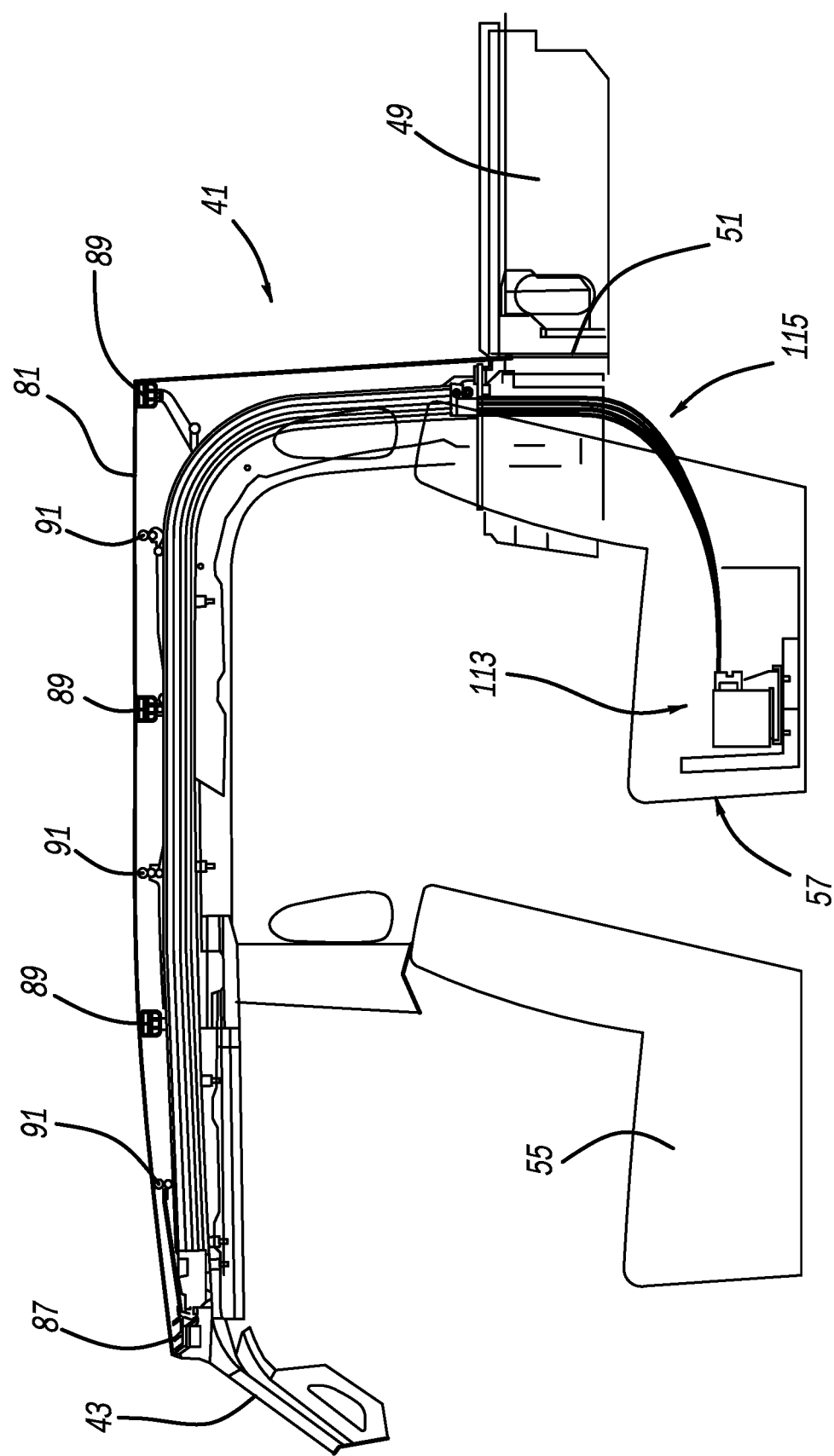
FIG. 3 is a side elevation view showing the present apparatus, in the closed position.
Figure 4:
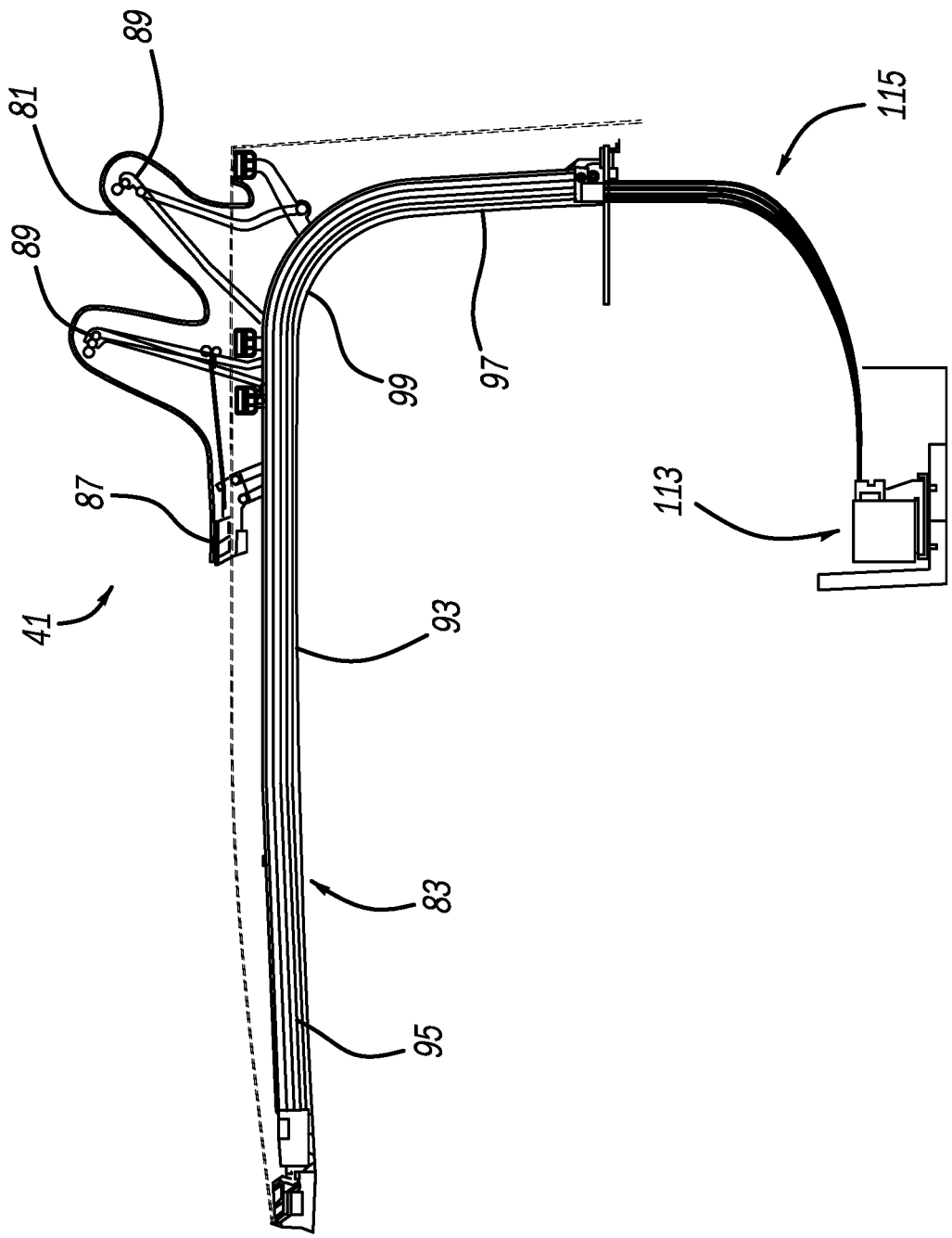
FIG. 4 is a side elevation view showing the present apparatus, in a partially open position.
Figure 8:
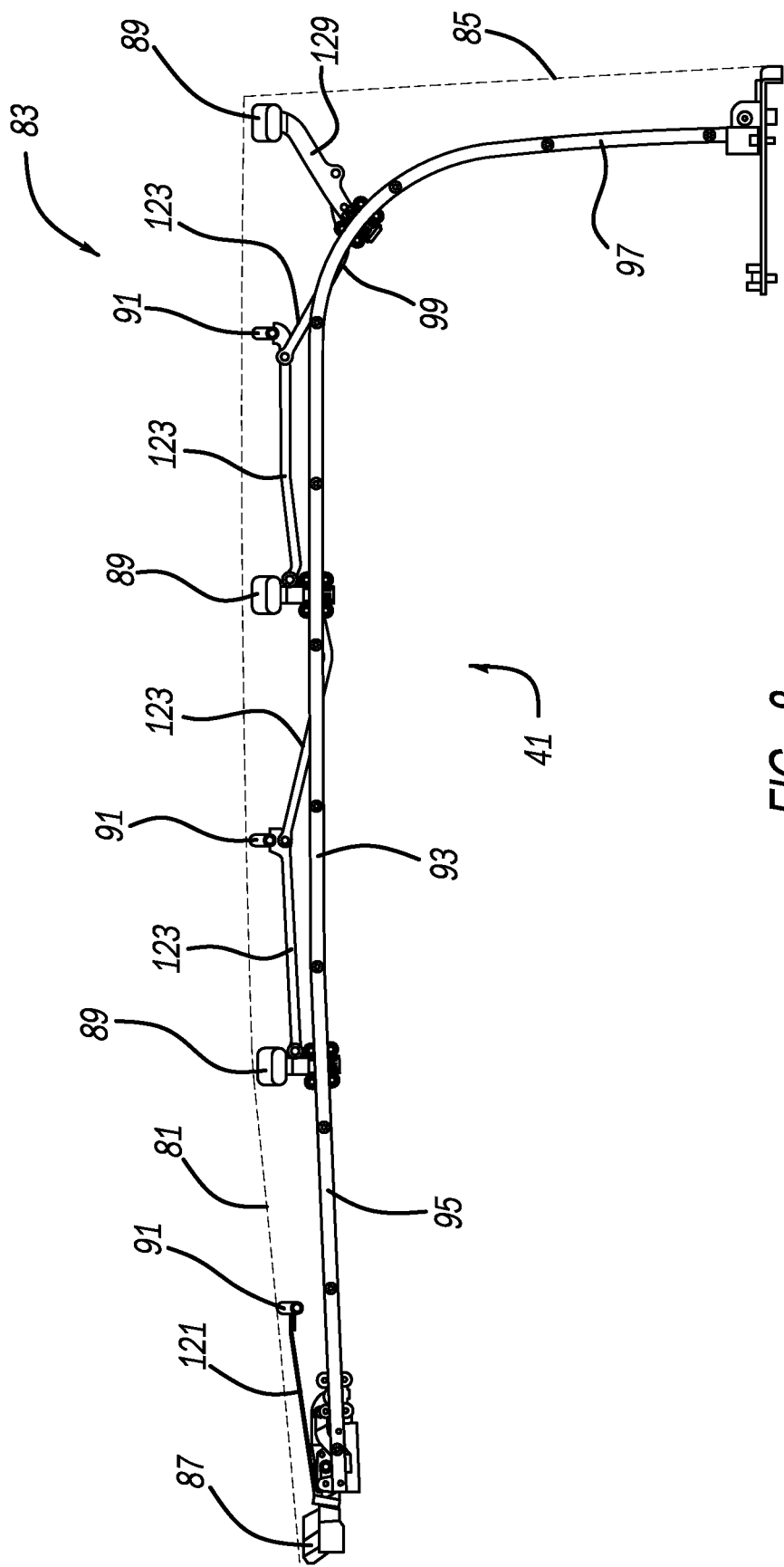
FIG. 8 is a side elevation view showing the present apparatus, in the closed position.
Figure 9:
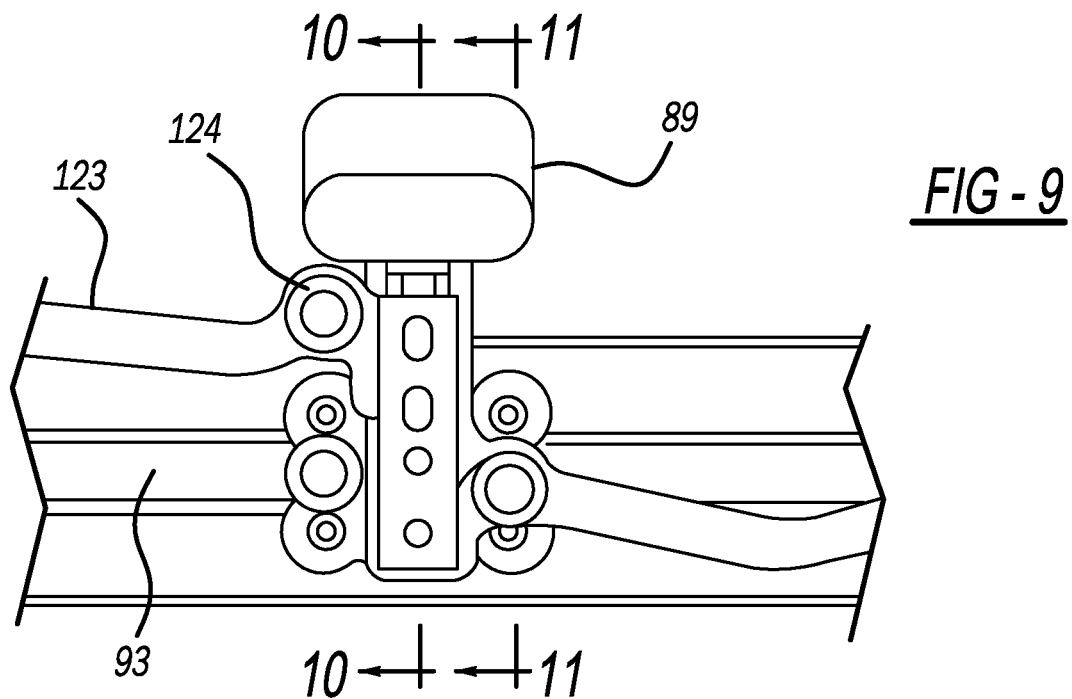
FIG. 9 is a fragmentary side elevation view showing the present apparatus, in the closed position.
Figure 10:
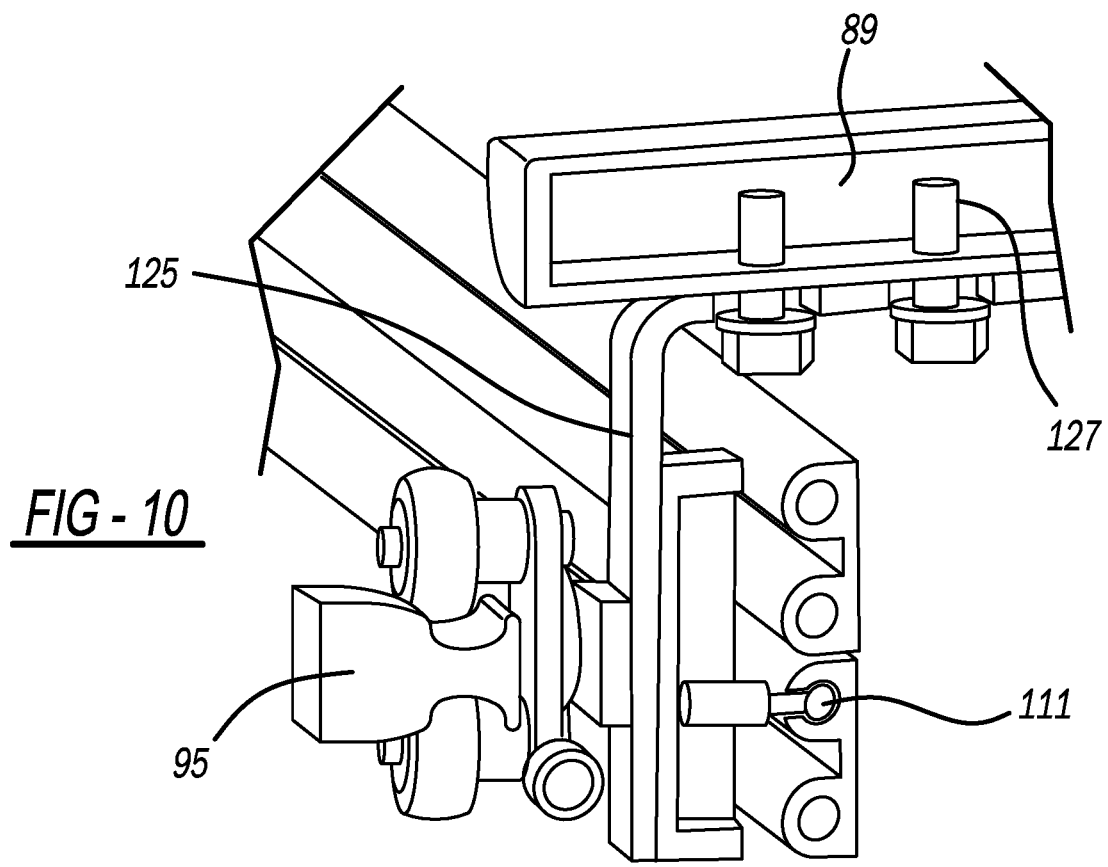
FIG. 10 is a sectional perspective view, taken along line 10-10 of FIG. 9, showing a portion of the present apparatus.
Figure 11:
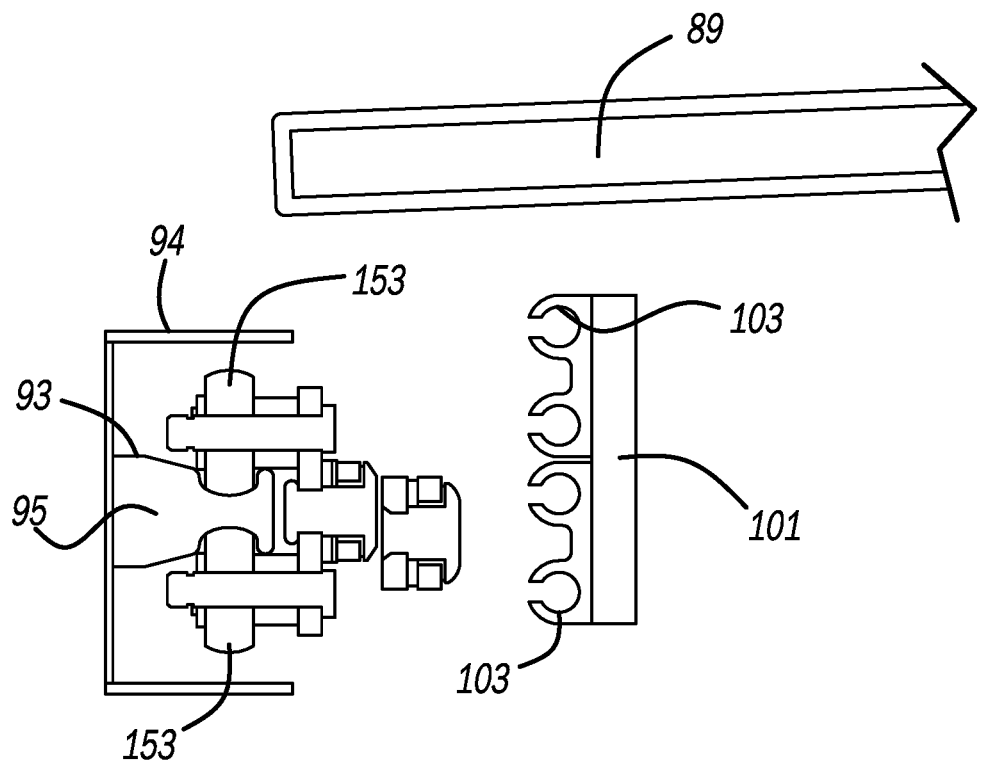
FIG. 11 is a cross-sectional view, taken along line 11-11 of FIG. 9, showing a portion of the present apparatus.
Figure 12:
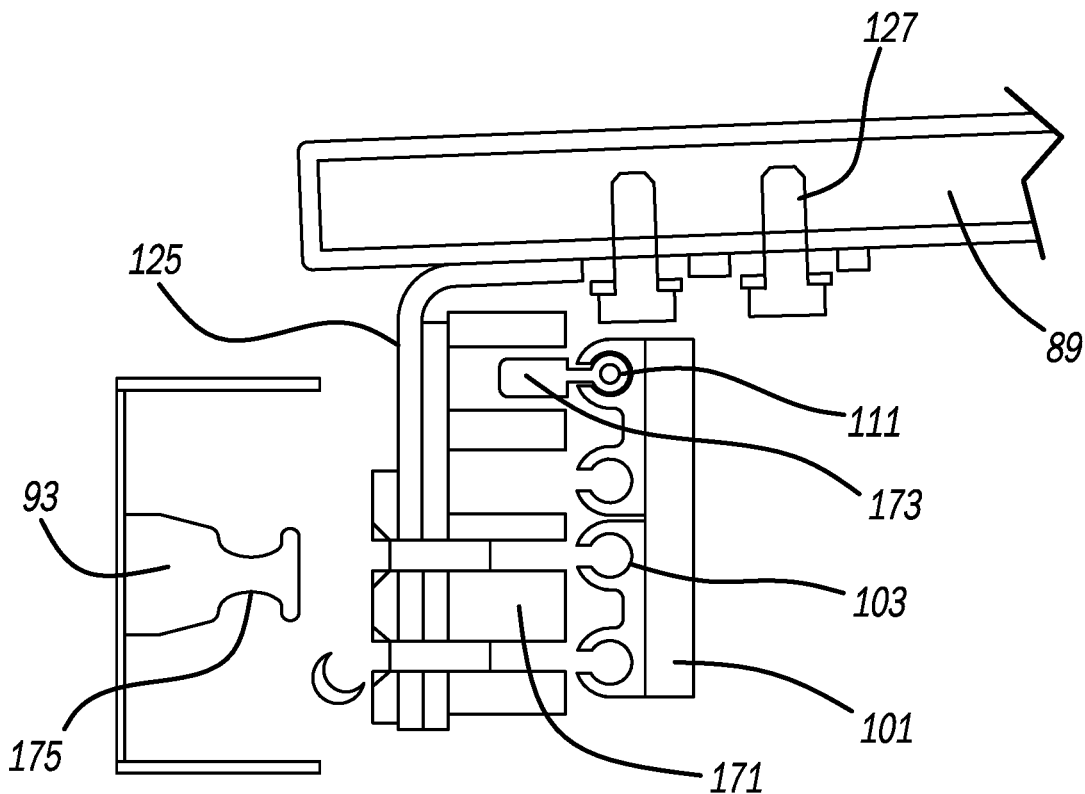
FIG. 12 is a cross-sectional view, taken along line 10-10 of FIG. 9, showing a portion of the present apparatus.
Figure 13:
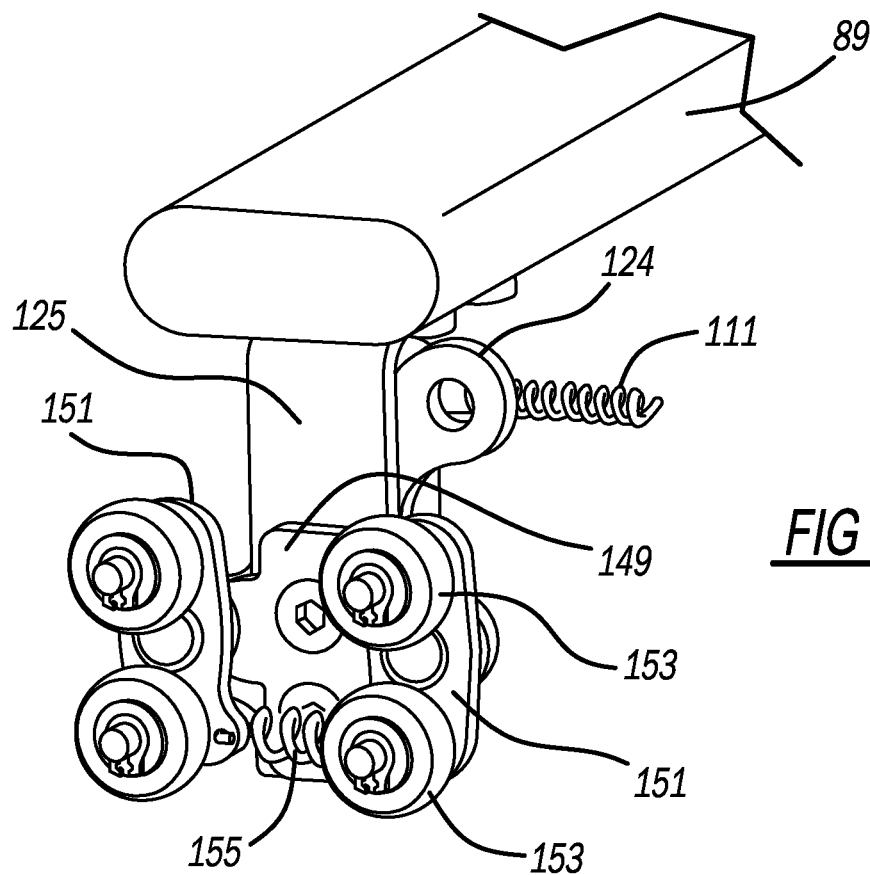
FIG. 13 is an enlarged perspective view of a roof bow and roller portion of the present apparatus.
Figure 14:
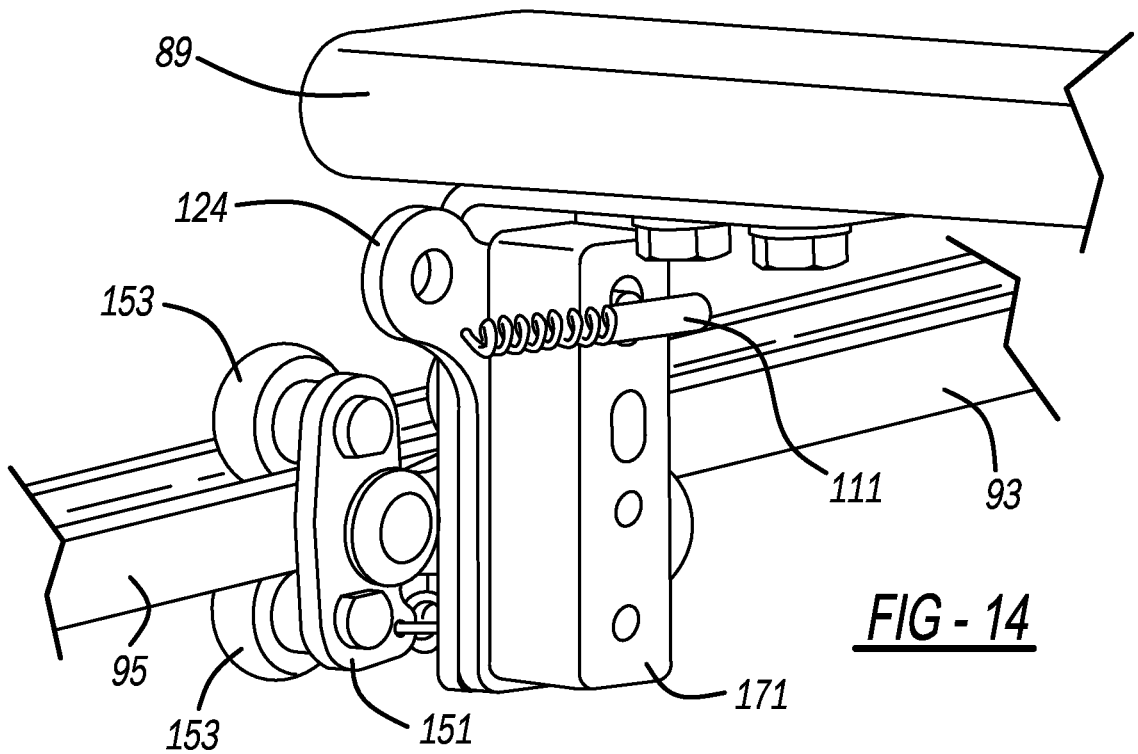
FIG. 14 is an enlarged perspective view of a roof bow, roller and guide rail portion of the present apparatus, opposite that of FIG. 13.
Figure 15:
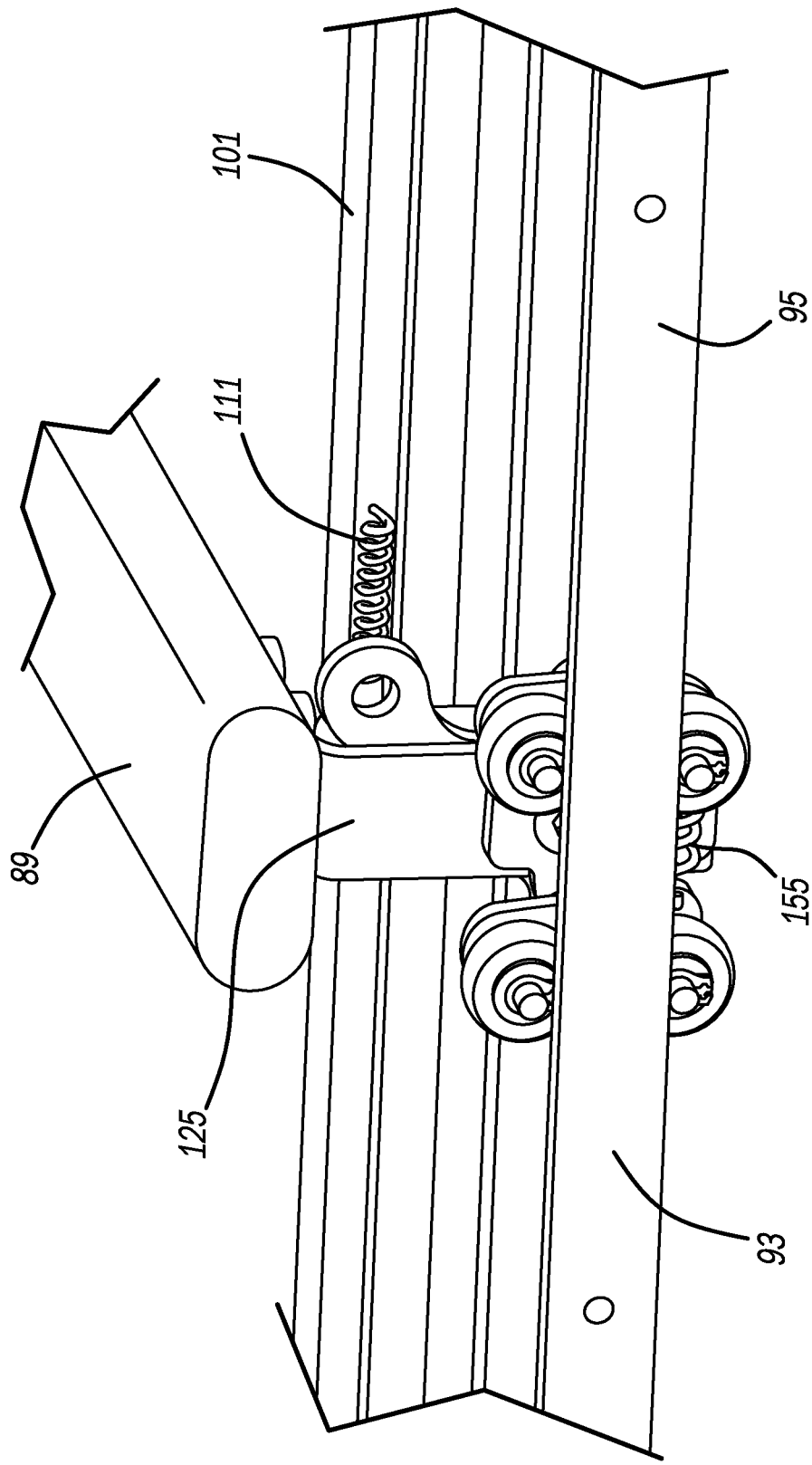
FIG. 15 is an enlarged perspective view of a roof bow, roller and guide rail portion of the present apparatus, like that of FIG. 13.
Figure 16:
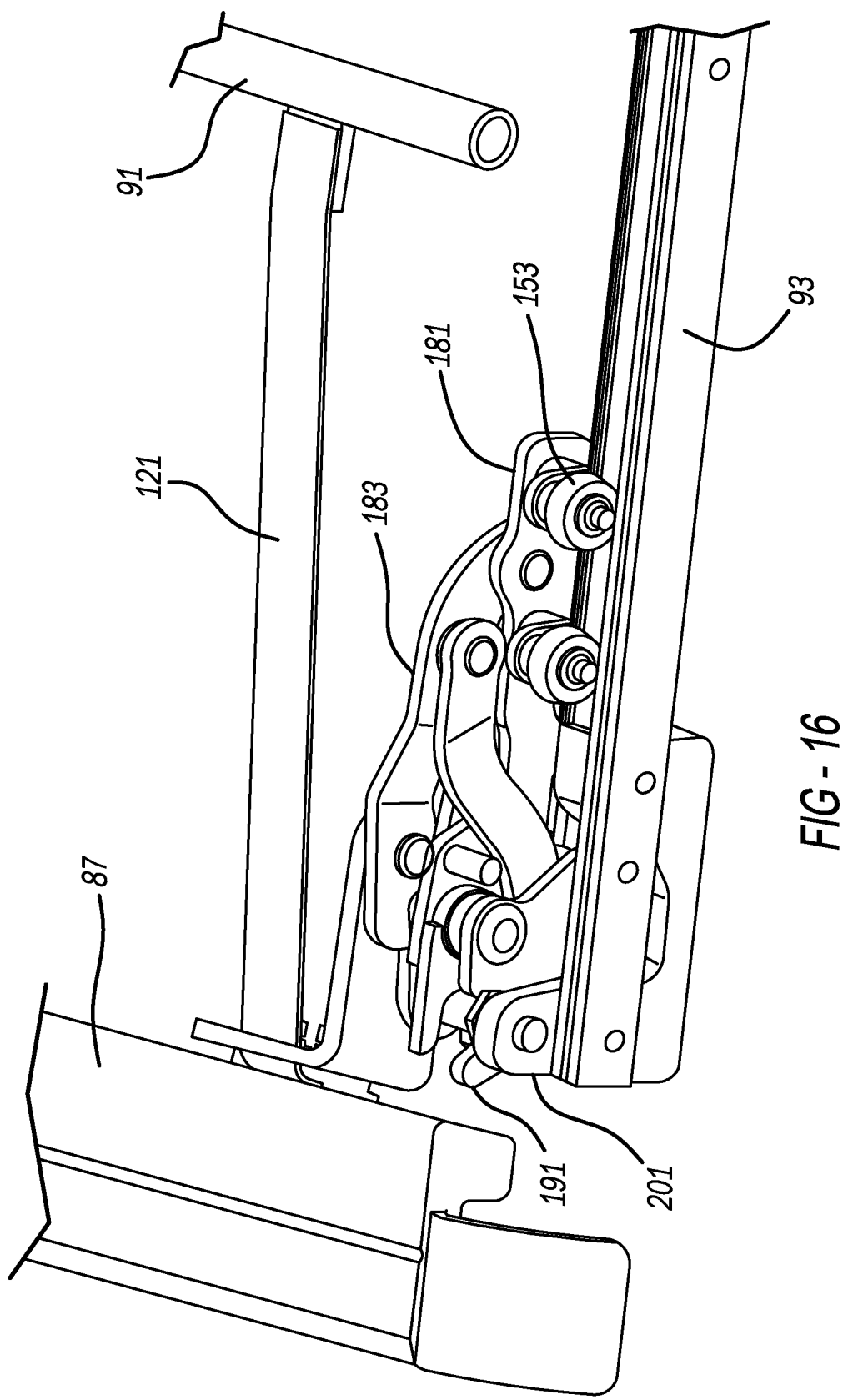
FIG. 16 is a top perspective view showing a header bow latching mechanism of the present apparatus, in a latched position.
Figure 17:
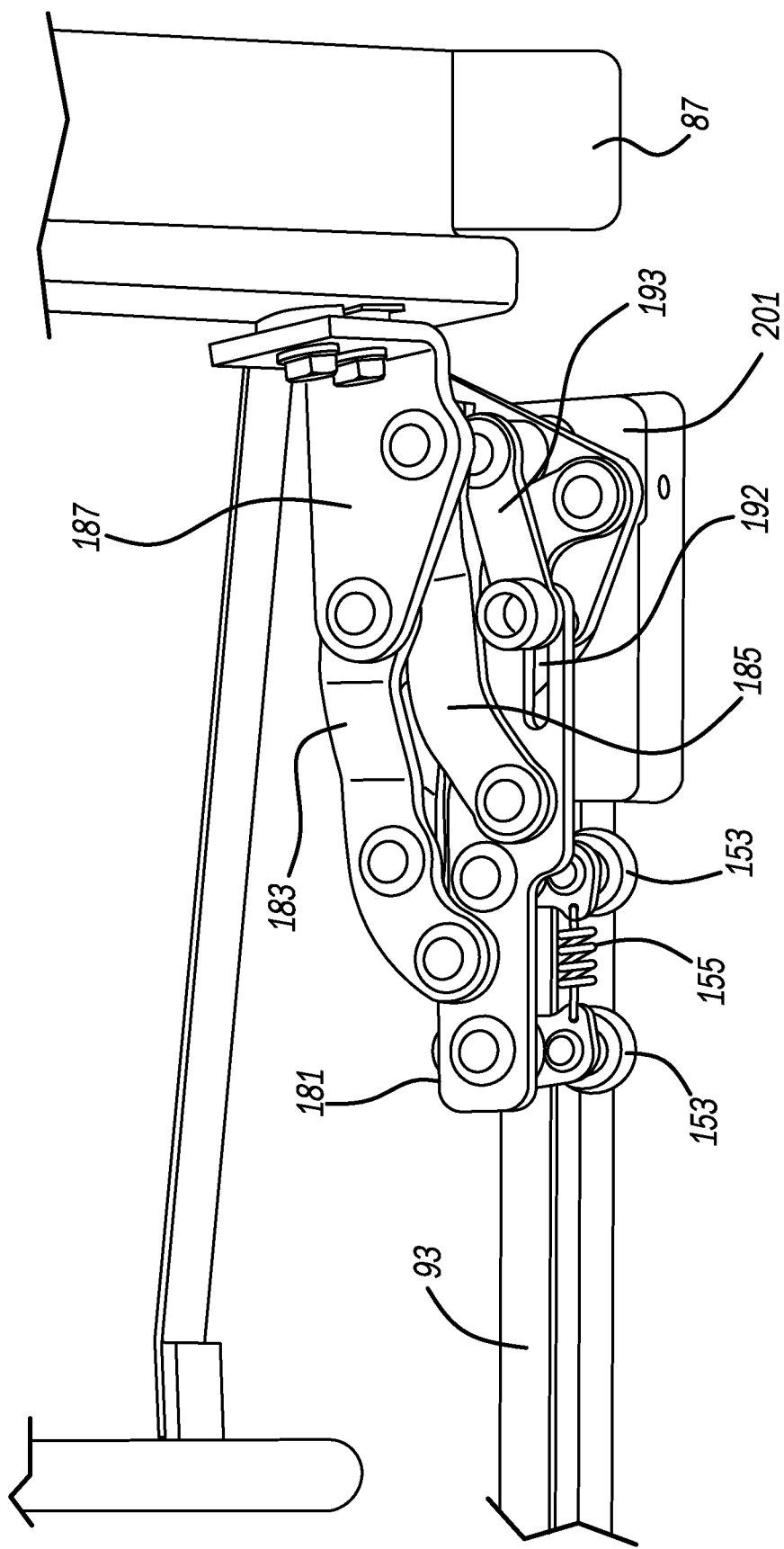
FIG. 17 is a bottom perspective view showing the header bow latching mechanism of the present apparatus, in the latched position.
Figure 18:
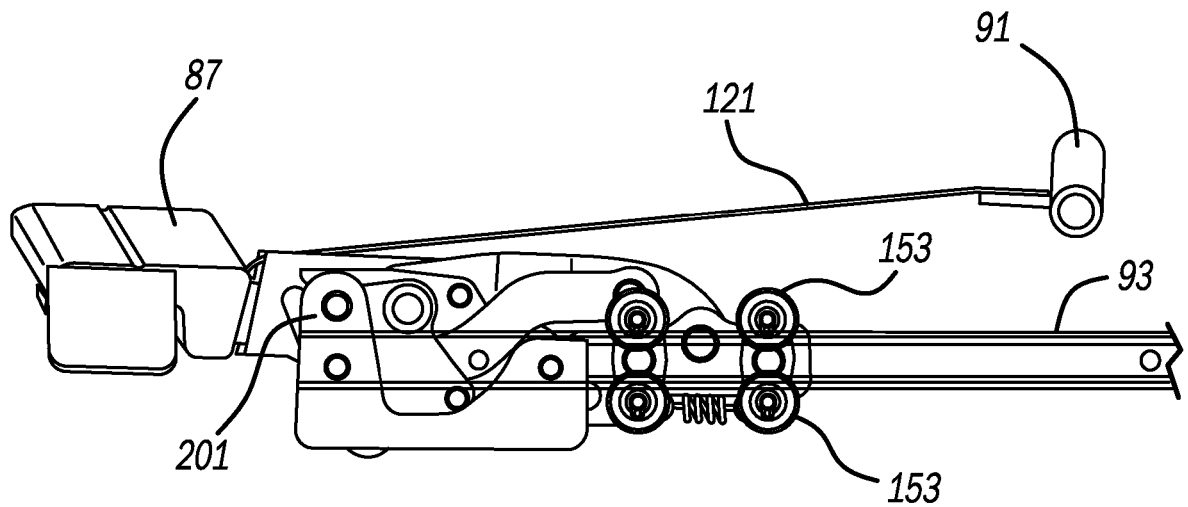
FIG. 18 is a side elevation view showing the header bow latching mechanism of the present apparatus, in the latched position.
Figure 19:
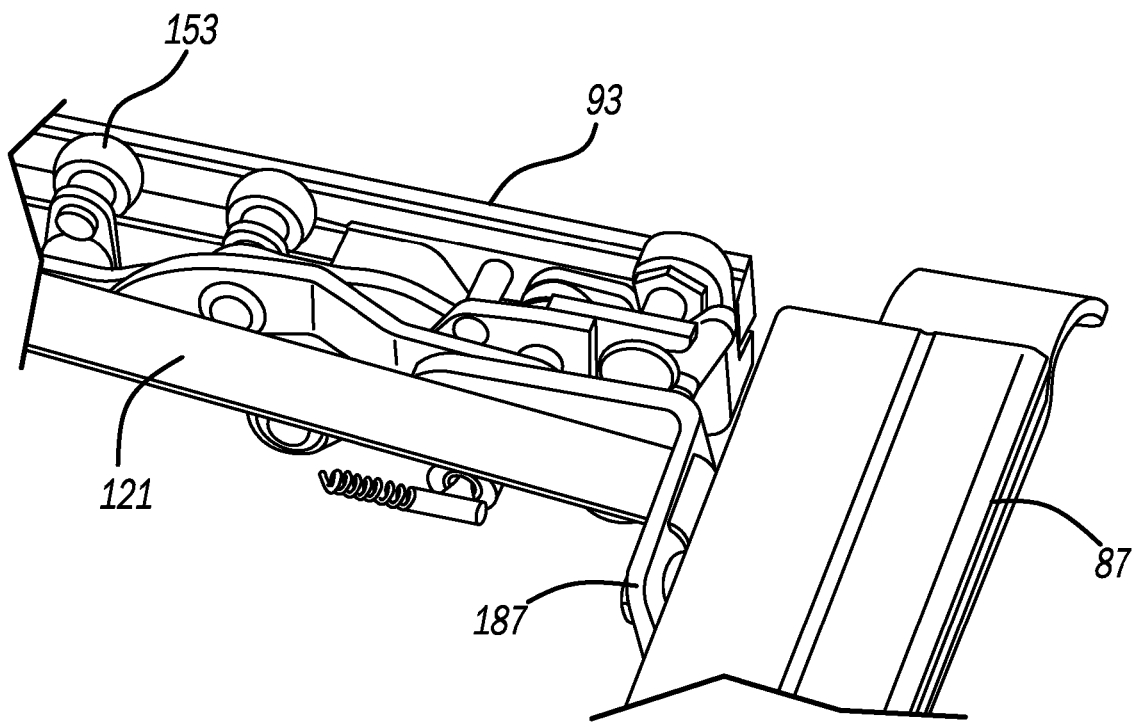
FIG. 19 is a top perspective view showing the header bow latching mechanism of the present apparatus, in the latched position.
Figure 20:
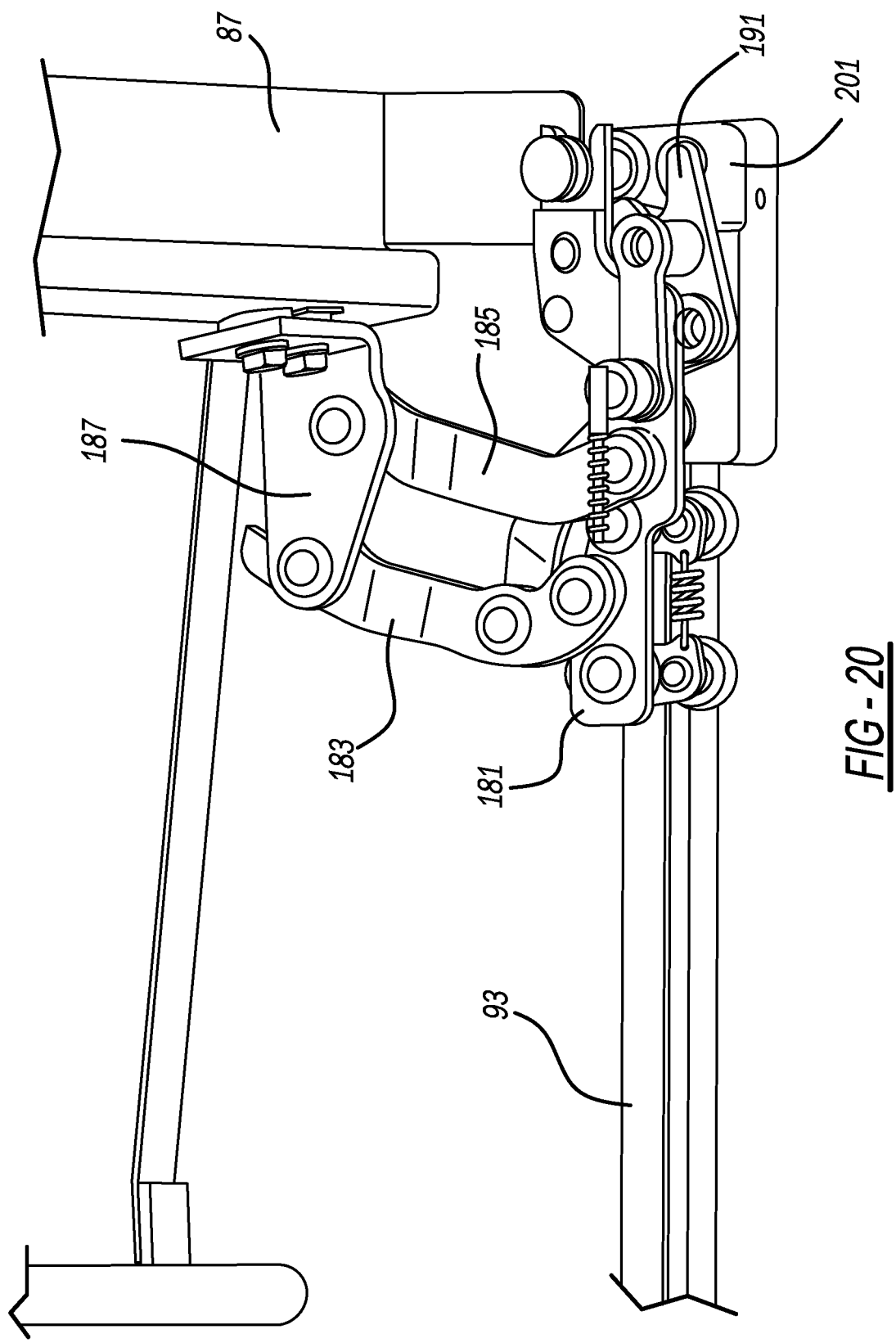
FIG. 20 is a bottom perspective view showing the header bow latching mechanism of the present apparatus, in a raised and unlatched position.
Figure 21:
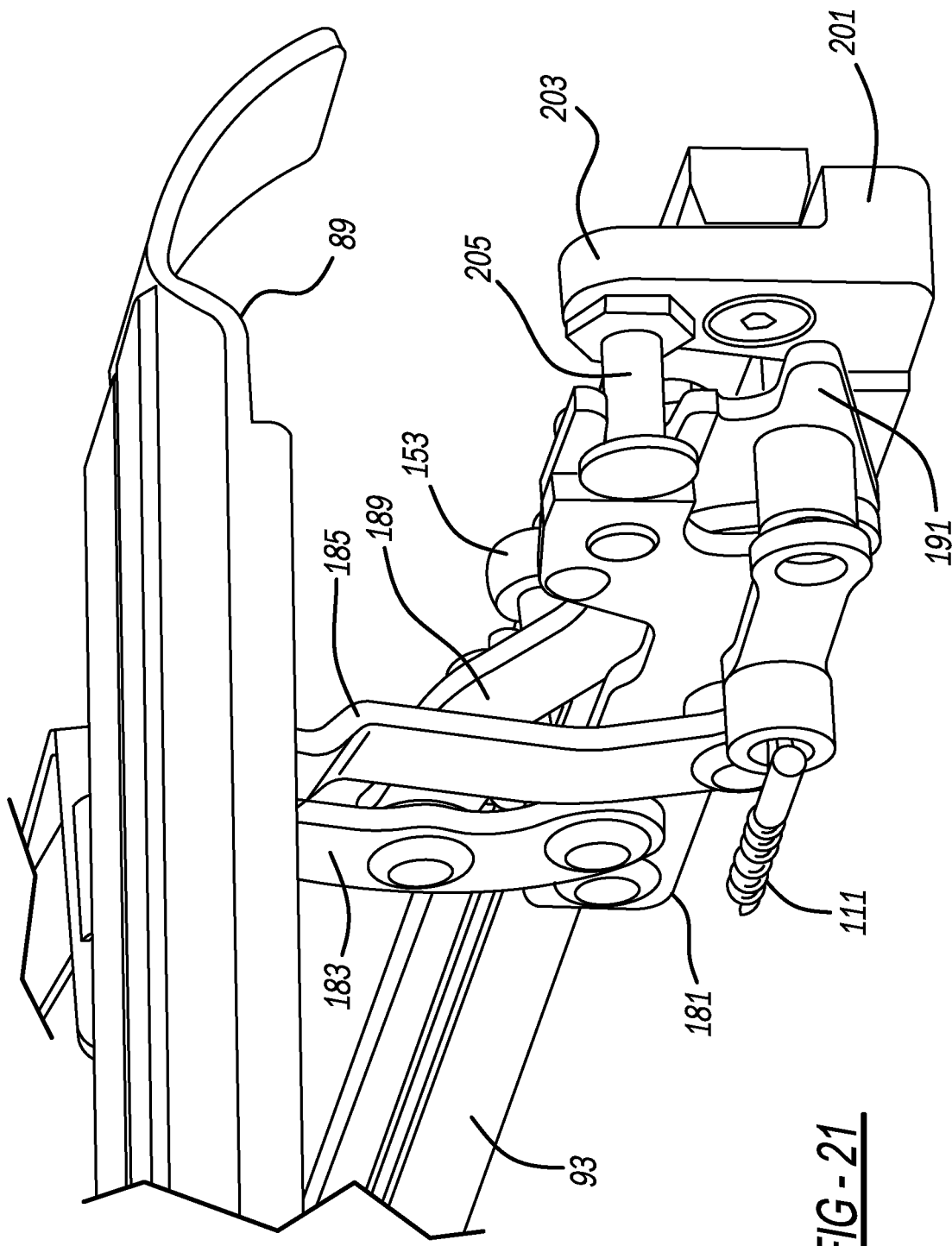
FIG. 21 is a front perspective view showing the header bow latching mechanism of the present apparatus, in the raised and unlatched position.
Figure 22:
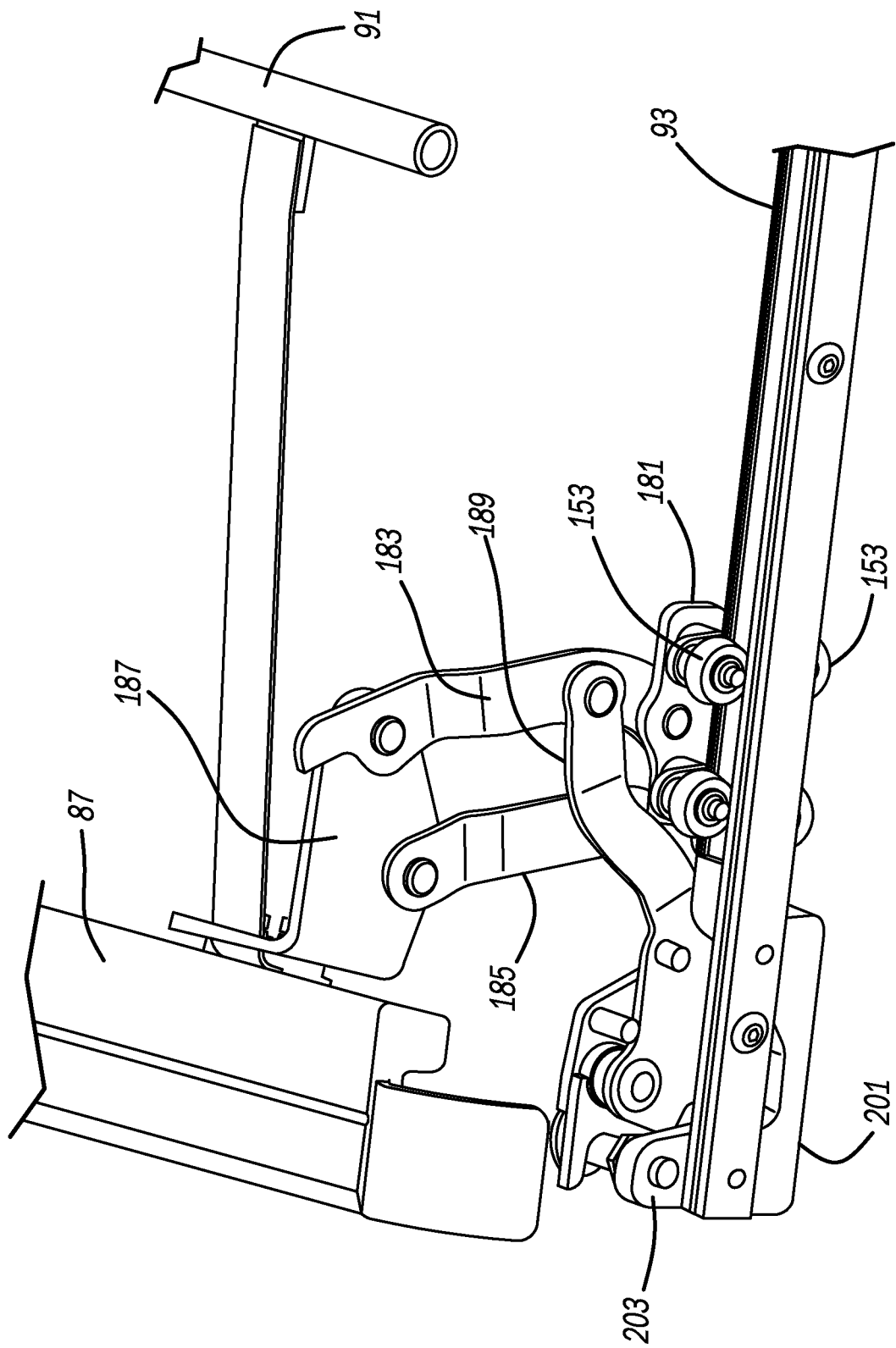
FIG. 22 is a top perspective view showing the header bow latching mechanism of the present apparatus, in the raised and unlatched position.
Figure 23:
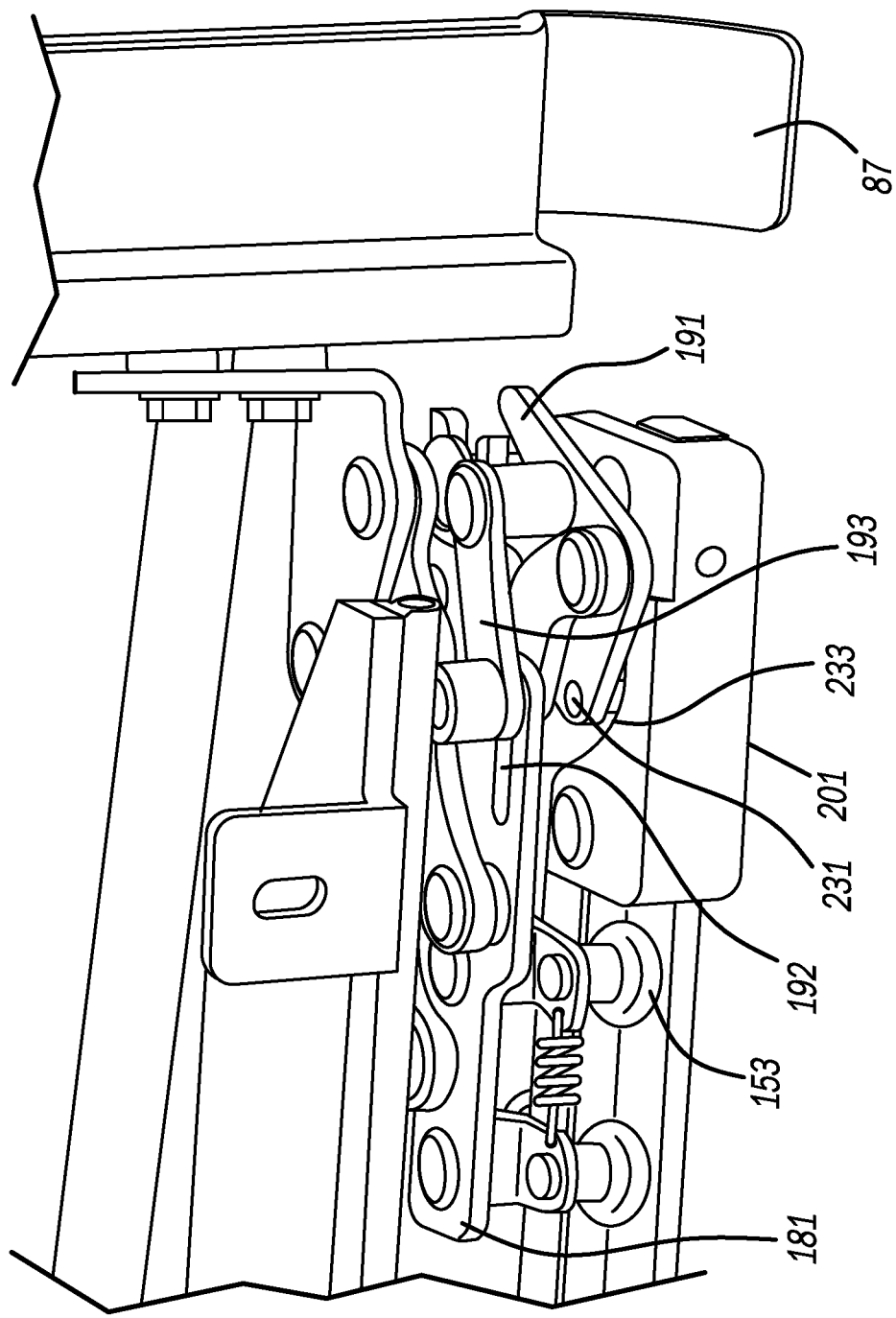
FIG. 23 is a bottom perspective view showing the header bow latching mechanism of the present apparatus, in the latched position.

Convertible roof apparatus 41 includes a soft-top fabric roof cover 81 connected to a moveable top stack mechanism 83. A rear window or backlite 85 (see FIG. 8) is attached to roof cover 81, and is preferably a flexible polymeric and transparent material that may optionally centrally fold about a horizontal crease when retracted. Convertible roof 41 is moveable from a fully raised and closed position shown in FIGS. 2, 3 and 8 to a fully retracted and open position shown in FIGS. 5 and 6 behind the passenger compartment and below a nominal horizontal roof plane 86. In the retracted position, the flexible roof cover 81 is generally rear of an entirety of roll bars 61 and is above only a forward minority portion of cargo compartment 49.

Reference should now be made to FIGS. 2-15. Top stack mechanism 83 of convertible roof 41 includes a forward-most header bow 87, at least three trailing primary roof bows 89, and at least three thinner auxiliary roof bows 91, all being elongated in a generally horizontal and lateral direction. Moreover, a guide rail 93 includes a generally horizontal front section 95 attached within a C-shaped profile 94 which is stationarily coupled to the vehicle side rail, a generally vertical rear section 97 coupled to the vehicle C-pillar, and an intermediate curved section 99 connecting between the front and rear sections of the guide rail.

A receptacle 101 includes multiple stationary channels 103 which are elongated substantially parallel to each other and to inboard and adjacent to an inward face of the associated guide rails 93. Each receptacle 101 is also stationarily coupled to the corresponding vehicular side rail. Receptacles 101 each have a generally horizontal front section, a generally vertically extending rear section and a curved intermediate section, all of which are laterally spaced from but aligned with the corresponding sections of guide rail 93.

An elongated and flexible Bowden or helix cable 111 is linearly pushed and pulled to slide within each channel 103 of receptacle 101. Actuators 113, including fractional horse power, DC electric motor and gear boxes, serve to move cable 111 within hollow and elongated tubes 115 connecting a bottom end of channels 103 to the gear boxes of actuators 113. There are multiple channels 103, cables 111 and tubes 115 for each left and right side of the vehicle, and more preferably four for each side such that there is one cable for each side of header and primary roof bows 87 and 89. Each actuator 113 may drive left and right pairs of cables 111 corresponding to each header and primary roof bow, thereby achieving synchronization thereof to reduce undesired cocking or jamming of the roof bow during sliding. It is noteworthy that actuators 113 are located below the bottom cushion and frame of rear seat 57 within passenger compartment 45, which beneficially is protected from cargo and the environment while being packaged in otherwise empty space.

Top stack mechanism 83 further includes a fore-aft elongated spring link 121 coupling an auxiliary bow 91 to header bow 87, to apply tension to an underside of the closed roof cover. Each side of the top stack mechanism also includes pivotably coupled, elongated links 123 for attaching auxiliary bow 91 to a lobe 124 coupled to the trailing primary bow 89. Lobe 124 is stationarily affixed for movement with the associated primary bow and a bracket. Each outboard side of each trailing primary bow 89 further has a generally inverted L-shaped bracket 125 with a lower and downwardly extending leg, and an upper and inwardly extending leg attached to a bottom of the associated primary bow by fasteners 127. An edge-bow link 129 pivotably couples each side of the rear upper corner primary bow 89 to the other links 123 and to its bracket 125.

Referring now to FIGS. 4-15, a generally + shaped holder 149 is centrally fastened to the lower leg of bracket 125 for each outboard side of each primary bow 89. A pair of carriers 151 are pivotably coupled to arms of holder 149, with the carriers being spaced apart from each other in a fore-and-aft direction (when viewed in the top-closed position). Upper and lower rollers or wheels 153 are rotationally mounted adjacent opposite ends of each carrier 151 to define a four-roller set. Furthermore, a coiled extension spring 155 biases facing edges of carriers 151, adjacent the lower rollers, toward each other.

An elongated connector block 171 is coupled to an inner face of bracket 125. A distal end of one of the cables 111 is attached to a hole in connector block 171 via a laterally projecting tab 173 which outwardly extends from an elongated slot opening in an outboard side of channel 103, such that the connector block moves with the associated cable.

Figure 5:
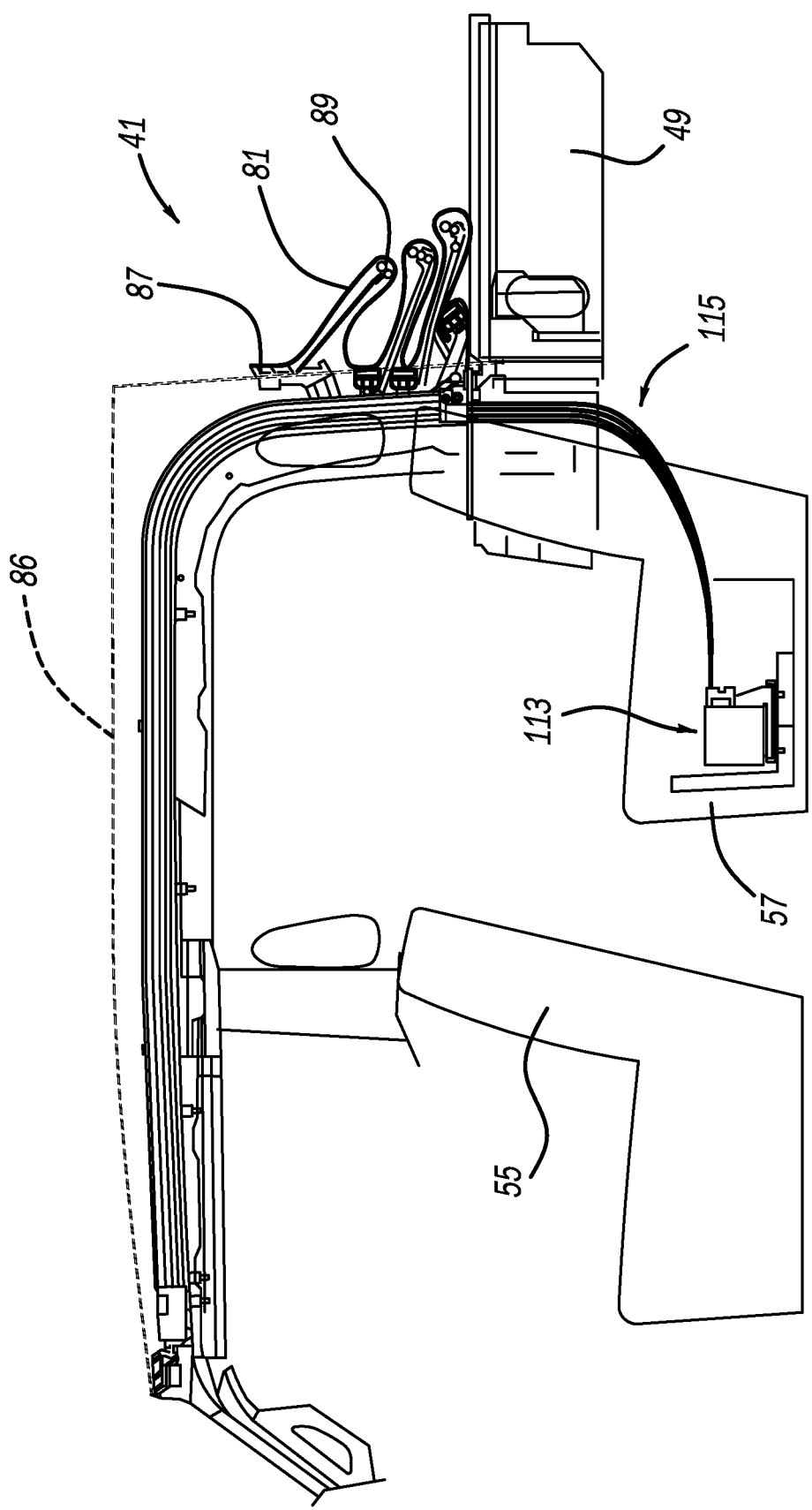
FIG. 5 is a side elevation view showing the present apparatus, in an open position.
Figure 6:
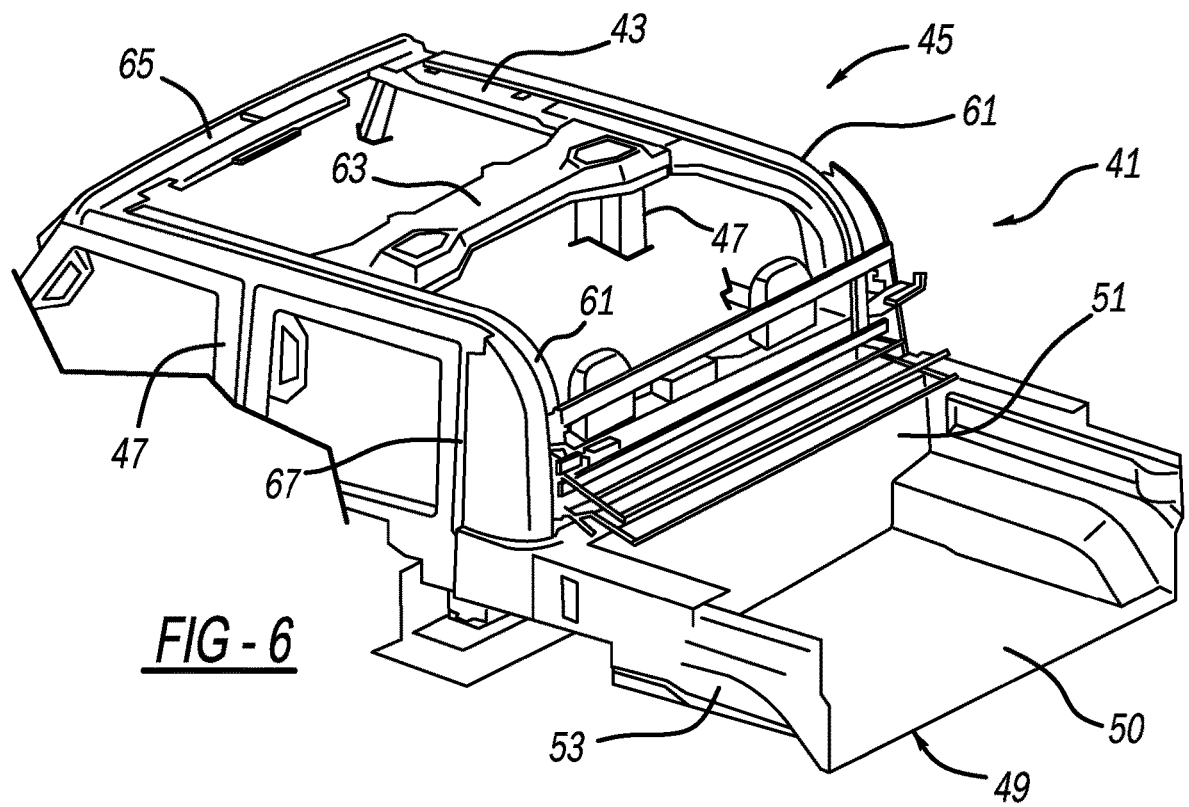
FIG. 6 is a top and rear perspective view of the present apparatus, in the open position.
Figure 7:
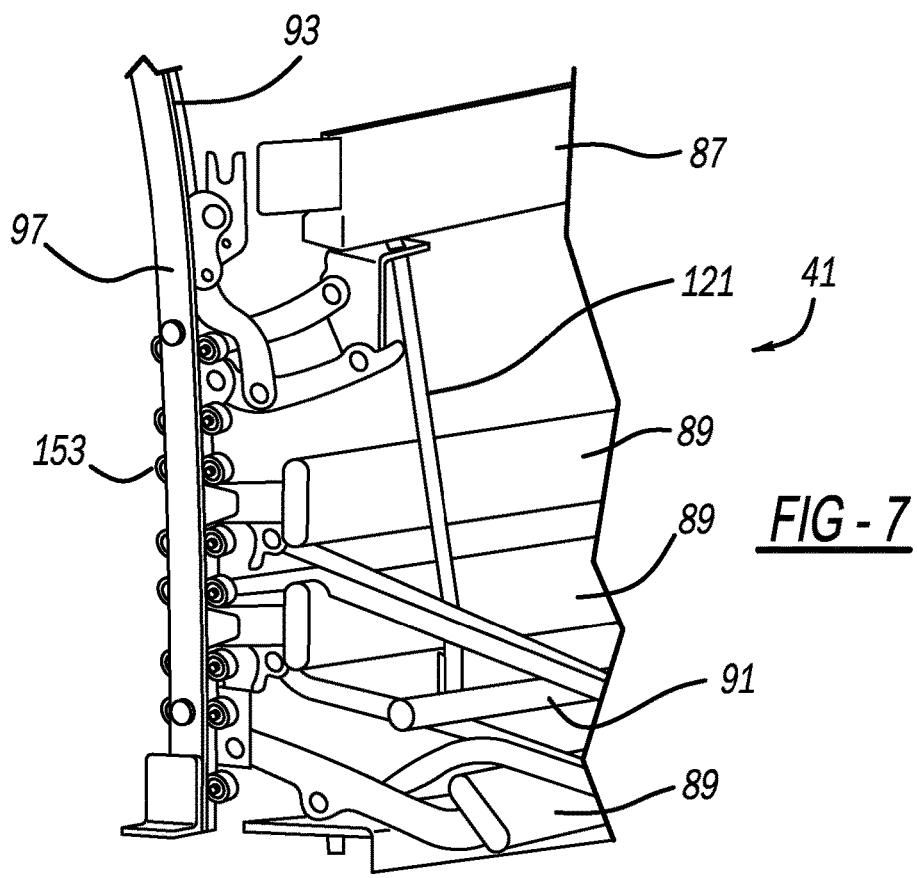
FIG. 7 is a rear and fragmentary perspective view of a rear section of the apparatus, in the open position.

Functionally, guide rail 93 has depressed grooves 175 in opposite external surfaces thereof within while ride rollers 153. Thus, the rollers trap the guide rail therebetween. This beneficially maintains engagement of the rollers to the guide rail as the cable pushes or pulls them around the curved corner section between the horizontal and vertical sections. Additionally, spring 155 advantageously maintains the desired carrier and roller orientations while as the rollers move between these guide rail sections. The carriers are oriented in a substantially vertical direction between the upper and the lower rollers when the roof cover is in the closed position as is illustrated in FIGS. 2, 3, 8, 14 and 15, but are oriented in a substantially horizontal direction between the upper and the lower rollers when the roof cover is in the open position with the roof bows and cover folds stacked upon each other as shown in FIG. 5-7.

FIGS. 16-23 illustrate a latching and cover tensioning mechanism for each outboard end of forwardmost header bow 87. The sets of rollers 153, carriers and holder are similar to those for the trailing bow, however, with this mechanism, holder 181 is elongated in a fore-and-aft direction (as viewed in the closed position). A parallelogram pair of links 183 and 185 have proximal pivots coupled to holder 181 and distal pivots coupled to an L-shaped insert 187. Furthermore, a guide link 189 has a rear pivot coupled to a median portion of link 183 and a front pivot coupled to a latch hook 191. Latch hook 191 is rotatable about a pivot coupled to a forward portion of holder 181, which in turn, has an outwardly projecting tab connected to a cable 111. A lost motion slot is in holder 181 within which rides a pivot for a control link 193 with its forward end pivotally coupled to latch hook 191.

A stationary insert block 201 is mounted to a front end of guide rail 93. Insert block 201 includes an upstanding pillar 203 from which inwardly and laterally projects a cylindrical pin 205 with an enlarged head. When cable 111 pushes holder 181 and header bow 87 toward its forward, end-of-travel position along guide rail 93, links 185 will collapse from the raised pre-closure positions of FIGS. 20-22 to the fully closed positions of FIGS. 16-18. This also drives control link 193 which causes latch hook 191 to rotate from a disengaged position to a latched position engaging pin 205 within its bifurcated forward end. A camming surface 233 is in an upper surface of block 201, which also serves to raise or lower a cam follower pin 231 so as to move latch hook 191 and the associated forward end of the attached links. The latched position firmly pulls the header bow against the stationary vehicular front header for compressing a weatherstrip therebetween.

While various embodiments have been disclosed, it should be appreciated that other variations may be employed. An exemplary top stack linkage mechanism has been disclosed, however, other mechanisms with more or less linkages, rails or bows can be used although certain benefits may not be achieved. Furthermore, exemplary shapes and lengths have been identified but other shapes and lengths may be employed. While a guide rail with generally horizontal and vertical sections is ideally suited for the presently disclosed devices, an alternate arrangement may use the guide rail sandwiching roller configuration and/or the header bow latching mechanism for a guide rail without the vertical section, although certain advantages may not be realized. It is also envisioned that the guide rail sandwiching roller configuration and the header bow latching mechanism may all be used together or separately. Moreover, each of the features may be interchanged and intermixed between any and all of the disclosed embodiments, and any of the claims may be multiply dependent on and intermixed with any of the others. Additional changes and modifications are not to be regarded as a departure from the spirit or the scope of the present invention.

The invention claimed is:

1. An automotive vehicle, convertible roof apparatus comprising:
    (a) a flexible convertible roof cover moveable from a closed position to an open position;
    (b) stationary and side vehicular-mounted guide rails each being elongated in substantially fore-and-aft directions, and the guide rails extending along a substantially horizontal, passenger compartment upper surface and along a substantially vertical, passenger compartment rear surface;
    (c) cross-vehicular elongated, roof bows spanning between the guide rails and supporting the roof cover;
    (d) couplings connecting at least one of the roof bows to the guide rails;
    (e) a first elongated actuator movable relative to and positioned adjacent to a first of the guide rails;
    (f) multiple rollers connecting a first of the couplings to the first of the guide rails, at least an upper one of the rollers being located above at least a lower one of the rollers with a segment of the guide rails therebetween when the roof cover is in the closed position; and
    (g) the actuator being configured to slide the roof cover and the roof bows rearwardly along the upper and rear surfaces when moved from the closed position to the open position.

2. The convertible roof apparatus of claim 1, further comprising:
    brackets each including a substantially horizontally extending leg attached adjacent an end of each of the roof bows and a substantially vertically extending leg when the roof cover is in the closed position;
    multiple additional rollers connecting each of the brackets to the first of the guide rails, at least an upper one of the additional rollers being located above at least a lower one of the additional rollers with another portion of the guide rails therebetween when the roof cover is in the closed position; and
    each of the brackets being coupled to an associated cable to move the bracket relative to the guide rails.

3. The convertible roof apparatus of claim 2, further comprising:
    a carrier spanning between each of the upper and lower of the rollers to define a roller set of the rollers;
    each of the brackets being coupled to a pair of the roller sets such that two of the upper rollers and two of the lower rollers are adjacent to each of the brackets;
    the carriers extending from a substantially vertical direction between the upper and the lower rollers when the roof cover is in the closed position, to a substantially horizontal direction between the upper and the lower rollers when the roof cover is in the open position; and
    a spring biasing links of a pair of the roller sets.

4. The convertible roof apparatus of claim 1, wherein the roofs bows further comprise:
    a forwardmost roof bow to which the first couplings are connected; and
    at least three trailing roof bows;
    the forwardmost roof bow and the at least three trailing roof bows all being raised above the guide rails when the roof cover is in the closed position.

5. The convertible roof apparatus of claim 1, further comprising:
    an electric motor located below a passenger seat; and
    the actuator is a Bowden cable which is pushed and pulled by the electric motor.

6. The convertible roof apparatus of claim 1, further comprising:
a rear window attached to and moveable with the roof cover;
the roof cover being stowed rearward of a vehicular seating area and lower than substantially horizontal portions of the guide rails;
a substantially vertical rear portion of each of the guide rails being offset angled 90-110° from the substantially horizontal upper portion of each of the guide rails; and
at least some of the rollers traveling along the guide rails from the substantially horizontal upper portions to the substantially vertical rear portions.

7. The convertible roof apparatus of claim 1, further comprising:
a vehicular passenger compartment including a front seating area and a rear seating area;
a vehicular cargo bed located behind the passenger compartment;
left and right side roll bars each including a substantially horizontal section above the passenger compartment and a substantially vertical rear section located between the passenger compartment and the cargo bed;
forward portions of the guide rails being located above and adjacent to the horizontal sections of the roll bars and rear portions of the guide rails being located rearward and adjacent to the vertical sections of the roll bars; and
a majority of the roof bows and a majority of the roof cover being stowed rearward of the roll bars and above the cargo bed.

8. The convertible roof apparatus of claim 1, further comprising:
a forwardmost of the roof bows;
a fork movably coupled to a forwardmost of the couplings, the fork including a forward facing bifurcated end;
a pair of links pivotally coupling the fork to the forwardmost of the roof bows;
a cross-car extending pin stationarily coupled adjacent a front end of one of the guide rails;
a hook pivotably coupled to the fork, the hook being rotatable about a substantially horizontal axis;
the fork and the hook being fore-and-aft slidable with the roof cover and the forwardmost of the roof bows; and
the fork and the hook being configured to automatically latch the forwardmost of the roof bows relative to the guide rails when the roof cover is moved to the closed position.

9. An automotive vehicle, convertible roof apparatus comprising:
(a) a convertible roof cover moveable from a closed position to an open position;
(b) left and right side vehicular-mounted guide rails each being stationary and elongated in substantially fore-and-aft directions;
(c) cross-vehicular elongated, roof bows spanning between the guide rails and supporting the roof cover;
(d) couplings connecting at least one of the roof bows to the guide rails;
(e) at least one elongated cable causing the roof cover and the roof bows to slide from a closed position to an open position;
(f) a vehicular passenger compartment including a front seating area and a rear seating area;
(g) a vehicular cargo bed located behind the passenger compartment;
(h) left and right side roll bars each including a substantially horizontal section above the passenger compartment and a rear section downwardly extending from the horizontal section of the roll bars to the cargo bed; and
(i) forward portions of the guide rails being located above and adjacent to the horizontal sections of the roll bars, and rear portions of the guide rails being located rearward and adjacent to the rear sections of the roll bars.

10. The convertible roof apparatus of claim 9, further comprising:
multiple rollers connecting a first of the couplings to one of the guide rails, at least an upper one of the rollers being located above at least a lower one of the rollers with a portion of the guide rails therebetween when the roof cover is in the closed position;
the roof cover comprises a flexible fabric material spanning over the roof bows; and
the at least one cable including multiple parallel cables being configured to slide the roof cover and the roof bows rearwardly when moved from the closed position to the open position, with the roof cover being stowed rearward of the vehicular passenger compartment and lower than the horizontal portion of the guide rails.

11. The convertible roof apparatus of claim 9, further comprising:
rollers connecting the couplings to the guide rails;
the rear portion of each of the guide rails being offset angled 90-110° from the forward portion of each of the guide rails; and
at least a majority of the rollers traveling along the guide rails from the forward portions to the rear portions.

12. The convertible roof apparatus of claim 9, wherein all of the roof bows are external to the roll bars in both the open and the closed positions of the roof cover.

13. The convertible roof apparatus of claim 9, further comprising:
a passenger seat within the passenger compartment;
an electric motor located below the passenger seat; and
the at least one cable includes multiple Bowden cables which are pushed and pulled by the electric motor.

14. The convertible roof apparatus of claim 9, further comprising:
brackets each including a substantially horizontally extending leg attached adjacent an end of each of at least some of the roof bows and a substantially vertically extending leg when the roof cover is in the closed position;
some of rollers connecting each of the brackets to the left guide rail, upper of the rollers connected to the brackets being located above lower of the rollers connected to the brackets, with an elongated middle segment of the left guide rail therebetween; and
each of the brackets being coupled to the at least one cable to move the bracket relative to the guide rails.

15. An automotive vehicle, convertible roof apparatus comprising:
(a) a flexible convertible roof cover moveable from a closed position to an open position;
(b) stationary vehicular-mounted guide rails each being elongated in substantially fore-and-aft directions from a substantially horizontal front portion to a substantially vertical rear portion, the rear portion of each of the guide rails being offset angled 90-110° from the front portion of each of the guide rails;
(c) roof bows supporting the roof cover;

(d) a rear window attached to and moveable with the roof cover;

(e) couplings connected to and movable along the guide rails;

(f) brackets connecting the couplings to the roof bows;

(g) at least one elongated and flexible cable connected to at least one of the brackets;

(h) an electric motor located below an occupant seating area within a passenger compartment area;

(i) energization of the electric motor being configured to cause the at least one of the cables to move the at least one of the brackets relative to the guide rails so as to slide the roof cover and the roof bows rearwardly along the front and rear portions of the guide rails when moved from the closed position to the open position; and (j) an entirety of the roof cover being stowed rearward of a vertical plane through a back of the occupant seating area and lower than the front portions of the guide rails.

16. The convertible roof apparatus of claim 15, wherein:

the brackets each include a substantially horizontally extending leg, attached to at least some of the roof bows, and a substantially vertically extending leg;

some of the couplings connect each of the brackets to a left one of the guide rails, an upper group of the couplings connected to the brackets being located above a lower group of the couplings connected to the brackets, with an elongated middle segment of the left guide rail therebetween; and each of the brackets are coupled to the at least one cable to move the bracket relative to the guide rails.

17. The convertible roof apparatus of claim 15, further comprising:

a carrier spanning between upper and lower groups of the couplings;

each of the brackets being coupled to a pair of the coupling groups such that two of the upper couplings and two of the lower couplings are adjacent to each of the brackets;

the carriers extending from a substantially vertical direction between the upper and the lower couplings when the roof cover is in the closed position, to a substantially horizontal direction between the upper and the lower couplings when the roof cover is in the open position; and a spring biasing links of a pair of the coupling groups.

18. The convertible roof apparatus of claim 15, wherein the roofs bows further comprise:

a forwardmost roof bow to which a first group of the couplings are connected; and at least three trailing roof bows;

the forwardmost roof bow and the at least three trailing roof bows all being raised above the guide rails when the roof cover is in the closed position.

19. The convertible roof apparatus of claim 15, further comprising:

multiple stationary channels elongated substantially parallel to each other and to an adjacent left one of the guide rails, the at least one cable comprising at least four cables each being movably located within an associated one of the channels;

each of the cables being coupled to an associated one of the brackets;

left ones of the brackets being laterally located between the channels and a left one of the guide rails;

openly accessible slots of the channels facing outboard toward the left brackets and the left guide rail; and the couplings being rollers.

20. The convertible roof apparatus of claim 15, further comprising:

a vehicular passenger compartment including the occupant seating area which is a rear seat;

multiples of the electric motor are located below the rear seat and being configured to drive multiples of the at least one cable;

a vehicular cargo bed located behind the passenger compartment;

left and right side roll bars each including a substantially horizontal section above the passenger compartment and a substantially vertical rear section located between the passenger compartment and the cargo bed;

the front portions of the guide rails being located above and adjacent to the horizontal sections of the roll bars and the rear portions of the guide rails being located rearward and adjacent to the vertical sections of the roll bars; and a majority of the roof bows and a majority of the roof cover being stowed rearward of the roll bars and above only a front portion of the cargo bed.

21. The convertible roof apparatus of claim 15, further comprising:

a forwardmost of the roof bows;

a fork movably coupled to a forwardmost of the couplings, the fork including a forward facing bifurcated end;

a pair of links pivotally coupling the fork to the forwardmost of the roof bows;

a cross-car extending pin stationarily coupled adjacent a front end of one of the guide rails;

a hook pivotably coupled to the fork, the hook being rotatable about a substantially horizontal axis;

the fork and the hook being fore-and-aft slidable with the roof cover and the forwardmost of the roof bows; and the fork and the hook being configured to automatically latch the forwardmost of the roof bows relative to the guide rails when the roof cover is moved to a closed position.

22. An automotive vehicle, convertible roof apparatus comprising:

(a) a flexible convertible roof cover moveable from a closed position to an open position;

(b) a stationary guide rail being elongated in a substantially fore-and-aft direction;

(c) cross-vehicular elongated, roof bows supporting the roof cover;

(d) brackets extending from the roof bows;

(e) rollers connecting the brackets to the guide rail;

(e) multiple flexible and elongated cables operably causing the roof cover to move between the positions;

(f) multiple stationary channels elongated substantially parallel to each other and to the guide rail, the cables each being movably located within an associated one of the channels;

(g) the cables being coupled to an associated one of the brackets; and (h) the brackets being laterally located between the channels and the guide rail.

23. The convertible roof apparatus of claim 22, further comprising openly accessible slots of the channels facing outboard toward the brackets and the guide rail.

24. The convertible roof apparatus of claim 22, wherein:
the brackets each include a substantially horizontally extending leg, attached to and adjacent an outboard end of the roof bows, and a substantially vertically extending leg, the vertically extending leg is located between the channels and the guide rail;
upper of the rollers being located above lower of the rollers with an elongated middle segment of the guide rail therebetween, the rollers are outboard of the vertical legs of the brackets.

25. The convertible roof apparatus of claim 22, further comprising:
a link spanning between upper and lower groups of the rollers;
each of the brackets being coupled to a pair of the roller groups such that two of the upper rollers and two of the lower rollers are adjacent to each of the brackets;
the links extending from a substantially vertical direction between the upper and the lower rollers when the roof cover is in the closed position, to a substantially horizontal direction between the upper and the lower rollers when the roof cover is in the open position; and
a spring biasing the links of a pair of the roller groups.

26. The convertible roof apparatus of claim 22, further comprising:
a vehicular passenger compartment including a front seating area and a rear seating area;
at least one electric motor located below the seating area within the passenger compartment, the electric motor operably moving the cables;
a vehicular cargo bed located behind the passenger compartment;
left and right side roll bars each including a substantially horizontal section above the passenger compartment and a substantially vertical rear section located between the passenger compartment and the cargo bed;
a forward portion of the guide rail being located above and adjacent to one of the horizontal sections of the roll bars and a rear portion of the guide rail being located rearward and adjacent to one of the vertical sections of the roll bars; and
a majority of the roof bows and a majority of the roof cover being stowed rearward of the roll bars and above the cargo bed.

\* \* \* \* \*